United States Patent [19]

Schwarzkopf

[11] Patent Number: 5,573,185
[45] Date of Patent: Nov. 12, 1996

[54] ELECTRICALLY HEATED NOZZLE FOR INJECTION-MOLDING MACHINE

[75] Inventor: Eugen Schwarzkopf, Lüdenscheid, Germany

[73] Assignee: Hotset Heizpatronen u. Zubehohr GmbH, Ludenscheid, Germany

[21] Appl. No.: 369,793

[22] Filed: Jan. 6, 1995

[30] Foreign Application Priority Data

Jan. 7, 1994 [DE] Germany .................... 9400152 U

[51] Int. Cl.$^6$ ...................................... B05B 1/24
[52] U.S. Cl. ............................................ 239/135
[58] Field of Search ................ 222/146.2, 146.5; 239/133, 135, 13, 600

[56] References Cited

U.S. PATENT DOCUMENTS

| | | | |
|---|---|---|---|
| 2,620,953 | 3/1989 | Seymarc | 239/135 |
| 4,196,855 | 4/1980 | Osuna-Diaz | 239/135 |
| 4,301,966 | 11/1981 | Schwarz | 239/135 X |
| 4,824,355 | 4/1984 | Lenhardt | 222/146.5 |
| 5,027,976 | 7/1991 | Scholl et al. | 239/135 X |

FOREIGN PATENT DOCUMENTS

| | | | |
|---|---|---|---|
| 1494986 | 7/1989 | U.S.S.R. | 239/135 |
| 2153909 | 8/1985 | United Kingdom | 239/135 |

*Primary Examiner*—Kevin Weldon
*Attorney, Agent, or Firm*—Herbert Dubno; Andrew Wilford

[57] ABSTRACT

A nozzle for an injection-molding machine has an elongated body centered on an axis and formed with an axially and longitudinally throughgoing passage, a threaded rear end, an outer wall, and a front end formed with a step having an axially forwardly directed annular face and a radially outwardly directed annular side surface set in from the outer wall. A removable nozzle element is set in the passage at the front end and an electrical heating element is provided on the outer wall. A protective sleeve coaxial with the body surrounds and encloses the body and heating element and has a front end at the body front end. An end ring set on the step has an inner periphery juxtaposed with the annular surface and an outer periphery juxtaposed with the sleeve front end. Respective inner and outer annular weld joints between the inner periphery and the annular surface and between the outer periphery and the sleeve front end secure the end ring in place.

4 Claims, 1 Drawing Sheet

ELECTRICALLY HEATED NOZZLE FOR INJECTION-MOLDING MACHINE

FIELD OF THE INVENTION

The present invention relates to an injection-molding machine. More particularly this invention concerns an electrically heated nozzle for such a machine.

BACKGROUND OF THE INVENTION

A standard nozzle for an injection-molding machine has an elongated body centered on an axis and formed with an axially and longitudinally throughgoing passage, a threaded rear end, an outer wall, and a front end. A removable nozzle element is fitted in the passage at the front end and an electrical heating element fits tightly on the outer wall. A protective sleeve coaxial with the body surrounds and encloses the body and heating element and has a front end at the body front end. An end ring is fitted in the front end of the gap between the sleeve and the body to close this space.

The problem with this arrangement is that the front end of the nozzle is subjected to considerable stress, in particular as the shot is made when molten plastic is forced under very high pressure from the nozzle. This pressurized mass exerts a considerable backward force on the end ring, often pushing it back into the space between the sleeve and the body. This not only compresses the heating element, but often lets plastic get into the space between the sleeve and the body where it can bulge out the sleeve. Since the nozzle normally fits with close tolerances in a passage in a mold, when it is thus bulged out it does not fit properly and can get jammed.

OBJECTS OF THE INVENTION

It is therefore an object of the present invention to provide an improved nozzle for an injection-molding machine.

Another object is the provision of such an improved nozzle for an injection-molding machine which overcomes the above-given disadvantages, that is which is built so as to preclude front end damage during normal use.

SUMMARY OF THE INVENTION

A nozzle for an injection-molding machine has according to the invention an elongated body centered on an axis and formed with an axially and longitudinally throughgoing passage, a threaded rear end, an outer wall, and a front end formed with a step having an axially forwardly directed annular face and a radially outwardly directed annular side surface set in from the outer wall. A removable nozzle element is set in the passage at the front end and an electrical heating element is provided on the outer wall. A protective sleeve coaxial with the body surrounds and encloses the body and heating element and has a front end at the body front end. An end ring set on the step has an inner periphery juxtaposed with the annular surface and an outer periphery juxtaposed with the sleeve front end. Respective inner and outer annular weld joints between the inner periphery and the annular surface and between the outer periphery and the sleeve front end secure the end ring in place.

Thus with this system the ring cannot be pushed back in between the sleeve and the body since it is bearing axially backward on the end face of the body. According to this invention the side surface is substantially frustoconical and rearwardly tapered while the inner surface of the ring is cylindrical. This leaves a triangular-section gap that is filled by the inner weld. To reduce the pressure that is backwardly effective on the front face of the ring, this front face is frustoconically forwardly tapered.

In accordance with a further feature of this invention the heating element is helical and pressed against the outer surface of the body. Furthermore the ring has a radially outwardly projecting lip that overlies the front sleeve end.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
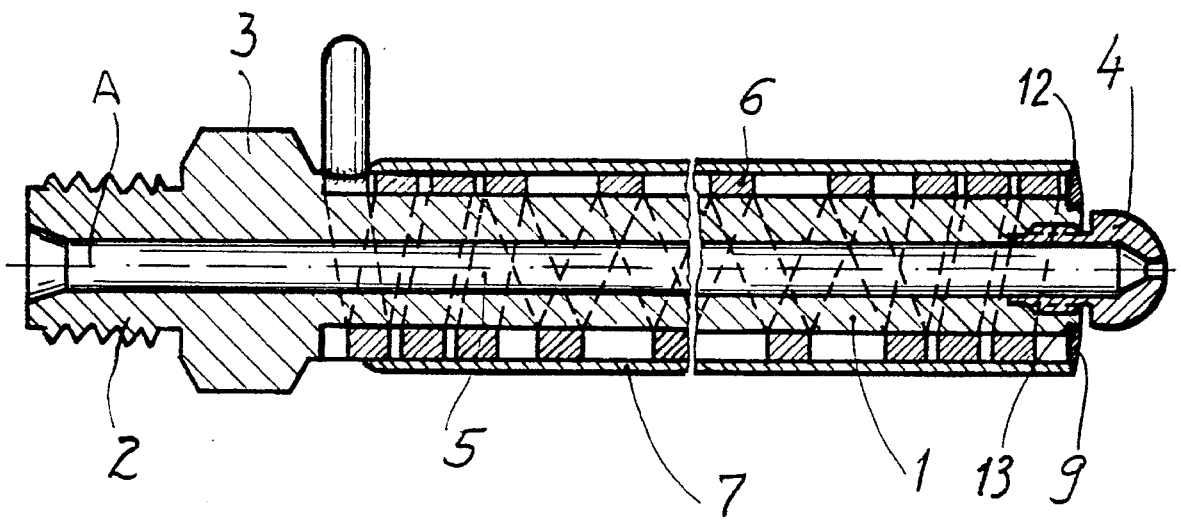
FIG. 1 is an axial and longitudinal section through the nozzle according to the invention.
Figure 2:
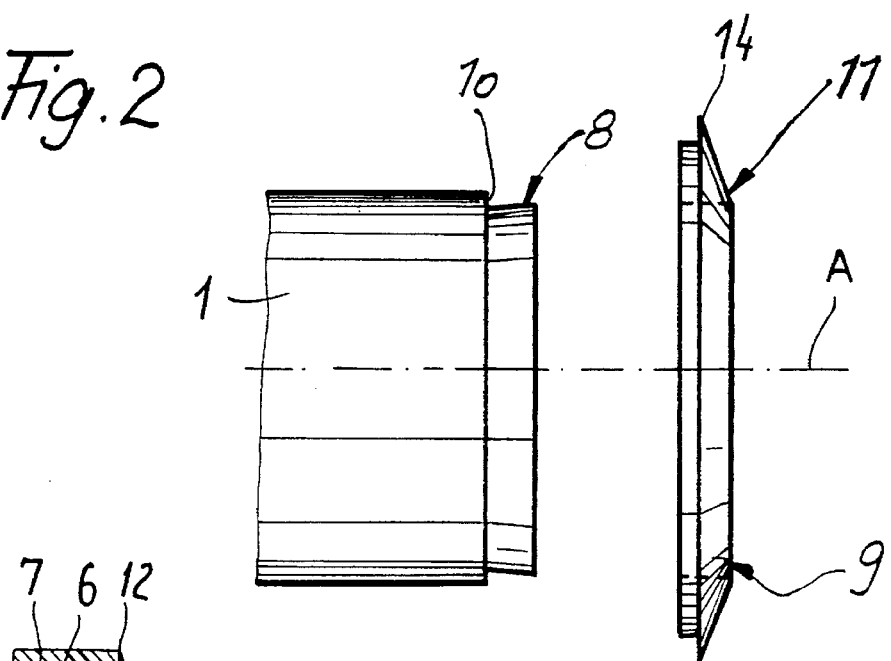
FIG. 2 is a large-scale exploded view of elements of the invention.
Figure 3:
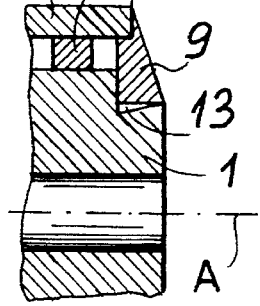
FIG. 3 is a large-scale view of a detail of FIG. 1.

As seen in the drawing a nozzle according to this invention has a tubular steel body 1 centered on an axis A and having a threaded rear end 2 and a hexagonal tool-engaging part 3 thereadjacent. A longitudinal passage 5 extends axially completely through the body 1 and a removable nozzle element 4 is screwed into the front (right hand in FIG. 1) end of the passage 5. A helical electrical heating element 6 of the resistive type is wound around the cylindrical outer surface of the body 1 and a thin metal sleeve 7 is fitted over the pressed-on heating element 6. All this structure is generally standard.

According to the invention the front end of the body 1 is formed with a step 8, 10 in turn constituted by a frustoconical and forwardly flaring side surface 8 and a planar and axially forwardly directed annular end face 10. A ring 9 having a cylindrical inner periphery roughly equal to the outside diameter of the side surface 8 at its frontmost portion is fitted on this step 8, 10 and has an axial length equal to the axial length of the surface 8. Thus a planar rear face of the ring 9 flatly abuts the end face 10 while a cylindrical inner surface of the ring forms a triangular-section space with the side surface 8. This ring 9 has a rearwardly flaring frustoconical front face 11 that forms a lip 14 that overlies a front end of the sleeve 7 while the body of the ring 9 fits in the cylindrical inner surface of the sleeve 7. Thus the front end of the sleeve 7 is slightly axially forward of the face 10 of the body 1.

The ring 9 is secured in place by an outer weld 12 between the lip 14 and the front end of the sleeve 7 and an inner weld 13 filling the triangular-section gap between the inner surface of the ring 9 and the surface 8.

The nozzle assembly is made by first press-fitting the element 6 over the body 1. Then the sleeve 7 is fitted and shrunk in place. The ring 9 is then fitted to the step 8, 10 and the welds 12 and 13 are formed. The nozzle element 4 can then be inserted into the bore 5.

I claim:

1. A nozzle for an injection-molding machine, the nozzle comprising:

an elongated body centered on an axis and formed with
an axially and longitudinally throughgoing passage,
a threaded rear end,
an outer wall, and a front end formed with a step having an axially forwardly directed annular end face and a radially outwardly directed, frusto-conical, and rearwardly tapered annular side surface set in from the outer wall;

a removable nozzle element in the passage at the front end;

an electrical heating element on the outer wall;

a protective sleeve coaxial with the body and surrounding and enclosing the body and heating element and having a front end at the body front end;

an end ring set on the step and having an inner periphery formed with a cylindrical inner surface juxtaposed with the annular side surface and forming therewith a triangular-section gap and an outer periphery juxtaposed with the sleeve front end; and respective inner and outer annular weld joints between the inner periphery and the annular side surface and between the outer periphery and the sleeve front end, the outer weld filling the gap.

2. The injection-molding nozzle defined in claim 1 wherein the ring has a frustoconical forwardly tapered front face.

3. The injection-molding nozzle defined in claim 2 wherein the heating element is helical and pressed against the outer wall of the body.

4. The injection-molding nozzle defined in claim 1 wherein the ring has a radially outwardly projecting lip that overlies the front sleeve end.

\* \* \* \* \*